United States Patent
Lee et al.

(10) Patent No.: US 11,561,530 B2
(45) Date of Patent: Jan. 24, 2023

(54) METHOD FOR PREDICTING AND COMPENSATING FRICTIONS OF FEED SYSTEM, AND COMPUTER READABLE STORAGE

(71) Applicant: Delta Electronics, Inc., Taoyuan (TW)

(72) Inventors: Chia-Yen Lee, Taoyuan (TW);
Yu-Hsiang Cheng, Taoyuan (TW);
Chia-Hui Chen, Taoyuan (TW);
Ping-Chun Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 114 days.

(21) Appl. No.: 17/031,235

(22) Filed: Sep. 24, 2020

(65) Prior Publication Data

US 2021/0373533 A1 Dec. 2, 2021

(30) Foreign Application Priority Data

May 27, 2020 (CN) .......................... 202010460140.2

(51) Int. Cl.
*G05B 19/416* (2006.01)
*G05B 19/414* (2006.01)
*G05B 23/02* (2006.01)

(52) U.S. Cl.
CPC ....... *G05B 19/4163* (2013.01); *G05B 19/414* (2013.01); *G05B 23/0283* (2013.01)

(58) Field of Classification Search
None
See application file for complete search history.

(56) References Cited

U.S. PATENT DOCUMENTS

| 4,492,905 A | * | 1/1985 | Pfister | H02P 7/291 318/470 |
| 6,519,860 B1 | * | 2/2003 | Bieg | B23H 7/26 73/1.79 |

(Continued)

FOREIGN PATENT DOCUMENTS

CN 104049567 A 9/2014

OTHER PUBLICATIONS

Office Action dated Feb. 8, 2021 of the corresponding Taiwan patent application No. 109117585.

*Primary Examiner* — Mohammad Ali
*Assistant Examiner* — David Earl Ogg
(74) *Attorney, Agent, or Firm* — Chun-Ming Shih; HDLS IPR Services

(57) ABSTRACT

A method for predicting and compensating frictions of a feed system includes following steps: constantly obtaining current signals and angle-position signals of a motor by a motor driver of a feed system after being activated; calculating frictions of the motor upon each rotating position according to the obtained current signals and angle-position signals and generating multiple records of friction data; creating a friction model according to the multiple records of friction data and the angle-position signals each respectively corresponding to each record of friction data with respect to each rotating position; importing current angle-position signal of the motor to the friction model for predicting a predicted friction; calculating a compensation current based on the predicted friction; and, controlling the motor driver to additionally provide the compensation current to the motor for conquering an upcoming friction of the feed system approximate to the predicted friction.

14 Claims, 6 Drawing Sheets

(56) References Cited

U.S. PATENT DOCUMENTS

| | | | | |
|---|---|---|---|---|
| 2003/0184002 | A1* | 10/2003 | Akiyama | B65H 3/0669 |
| | | | | 271/110 |
| 2004/0193385 | A1* | 9/2004 | Yutkowitz | G05B 19/404 |
| | | | | 702/151 |
| 2011/0050146 | A1* | 3/2011 | Okita | G05B 19/404 |
| | | | | 318/631 |
| 2014/0278332 | A1* | 9/2014 | Grammatikakis | H02S 50/00 |
| | | | | 703/18 |
| 2015/0168938 | A1* | 6/2015 | Fujimoto | G05B 19/4163 |
| | | | | 700/160 |
| 2016/0239594 | A1* | 8/2016 | Fujita | G05B 19/404 |
| 2016/0363939 | A1* | 12/2016 | Mochizuki | G05B 19/404 |
| 2018/0032052 | A1* | 2/2018 | Ishii | G01M 1/28 |
| 2019/0291777 | A1* | 9/2019 | Ishio | B62D 5/0463 |
| 2020/0333764 | A1* | 10/2020 | Takahei | G05B 19/4086 |

* cited by examiner

METHOD FOR PREDICTING AND COMPENSATING FRICTIONS OF FEED SYSTEM, AND COMPUTER READABLE STORAGE

BACKGROUND OF THE INVENTION

1. Field of the Invention

The invention relates to a feed system, and in particularly to a method for predicting and compensating frictions of the feed system.

2. Description of Related Art

A feed system, such as an automation equipment, uses a motor for operation. Generally, at the instant moment when the motor reverses, the motor won't have enough power to conquer the maximum static friction generated by mechanical components of the feed system, and it may cause discontinuous issue on the speed of the motor. As a result, manufacturing veins may be produced at the commutated portions of the motor, and that affects the quality and accuracy as manufacturing products by the feed system.

FIG. 1 is a schematic diagram showing a feed system as well as frictions thereof. As shown in FIG. 1(a), a feed system 1 has at least one set of mechanical components 11. After being activated, the feed system 1 can control a motor (not shown) to rotate, and then guide the mechanical components 11 to continually move upward, downward, leftward, rightward, frontward, and backward, according to the rotation of the motor, so as to manufacture products by the feed system 1 itself.

For guiding the mechanical components 11 to move toward the opposite, the motor has to rotate reversely. As discussed, the motor does not have enough power to conquer the static friction caused by the mechanical components 11 at the instant moment when the motor reverses, so a ballbar trace 2 like the drawing shown in FIG. 1(b) will be produced. As shown in FIG. 1(b), the motor of the feed system 1 will generate a commutation sharp angle at each commutated portion 20, and it indicates that the power of the motor at each commutated portion 20 is not enough in conquering the friction.

In order to solve the aforementioned problem, a skilled person in the technical field definitely needs new and inventive system and method, which can analyze the motor of the feed system, for predicting the power the motor may need as dealing with the friction at each rotating position and compensating such power for the motor. Therefore, the manufacturing quality and accuracy of the feed system can be effectively increased.

SUMMARY OF THE INVENTION

The object of the present invention is to provide a method for predicting and compensating frictions of feed system, and a computer readable storage for the same, which can predict frictions of a feed system after the feed system is activated, and then provides an additional compensation current to a motor of the feed system for the motor to conquer the frictions as predicted.

In one of the exemplary embodiments, the method for predicting and compensating frictions of feed system in the present invention is used by a feed system including at least one mechanical component, a motor guiding the mechanical component to move, and a motor driver electrically connected with the motor for controlling the motor to rotate, and the method for predicting and compensating frictions of feed system at least includes following steps:

a) continually obtaining current signals and angle-position signals of the motor by the motor driver while the motor rotates;

b) estimating frictions of the motor related to each rotation position of the motor according to the current signals and the angle-position signals, for generating multiple records of friction data;

c) performing a calculation, based on the multiple records of friction data and the multiple angle-position signals respectively corresponding to each of the records of friction data, for creating a friction model with respect to the motor;

d) importing a current record of the angle-position signal of the motor to the friction model for predicting a predicted friction of the feed system;

e) calculating a corresponding compensation current based on the predicted friction; and f) controlling the motor driver to additionally provide the compensation current to the motor.

In another one of the exemplary embodiments, the computer readable storage in the present invention is recorded with computer executable program codes, and the following steps are implemented after the computer executable program codes are executed:

a) continually obtaining, by a motor driver of a feed system, current signals and angle-position signals of a motor of the feed system while the motor rotates;

b) estimating frictions of the motor related to each rotation position of the motor according to the obtained current signals and the obtained angle-position signals, for generating multiple records of friction data;

c) performing a calculation, based on the multiple records of friction data and the multiple angle-position signals respectively corresponding to each of the records of friction data, for creating a friction model with respect to the motor;

d) importing a current record of the angle-position signal of the motor to the friction model for predicting a predicted friction of the feed system;

e) calculating a corresponding compensation current based on the predicted friction; and f) controlling the motor driver to additionally provide the compensation current to the motor.

In comparison with related art, the feed system of the present invention provides additional compensation current to the motor for conquering frictions of the feed system while the motor rotates, and the problem of poor manufacturing quality and accuracy of the feed system due to the insufficient power of the motor as the motor reverses can be effectively solved.

Besides, by continually predicting and monitoring the frictions of the feed system, the present invention can estimate the actual health status of the feed system based on friction-related parameters at different time points, so as to determine whether the feed system should be maintained or updated.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

The present invention discloses a method for predicting and compensating frictions of feed system, which is used to predict the frictions of a feed system while the feed system operates, and to compensate a motor of the feed system in time for the motor to conquer the frictions that the feed system is about to confront. Therefore, a problem that the manufacture quality and accuracy of the feed system are affected by the motor in lacking of power to conquer the frictions of the feed system, can be effectively prevented.

Figure 1A:
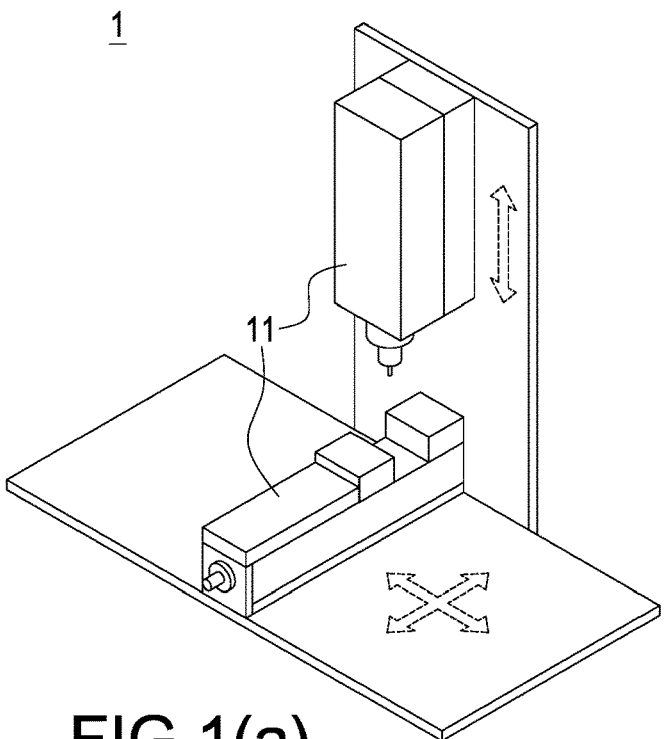
FIG. 1 is a schematic diagram showing a feed system as well as frictions thereof.
Figure 1B:
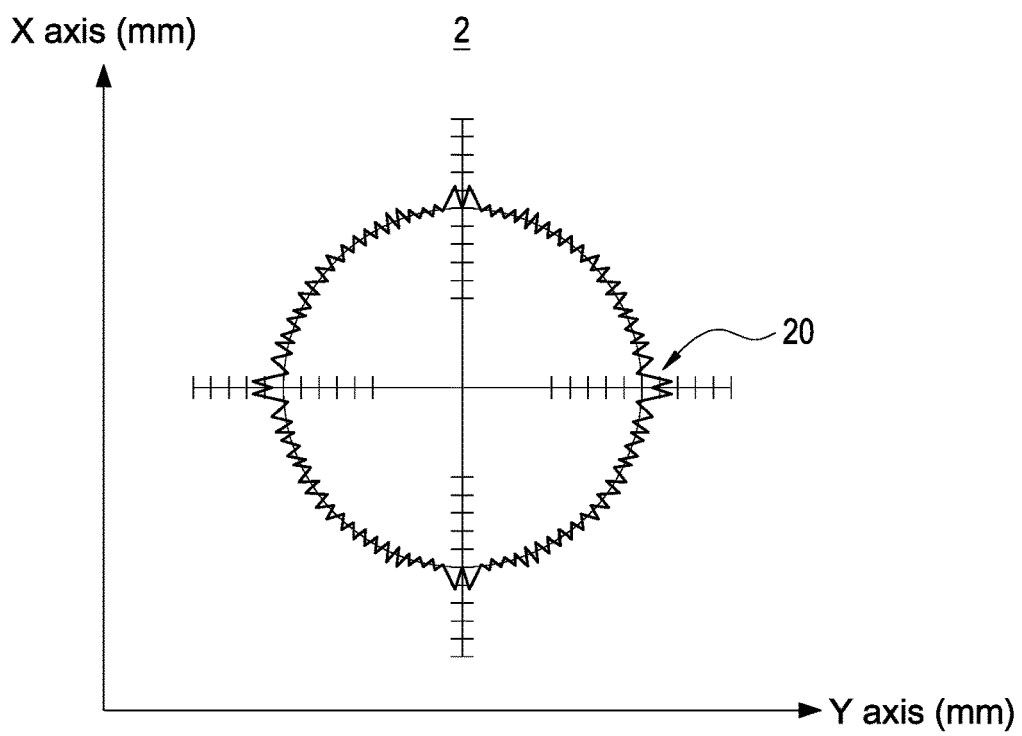
Figure 2:
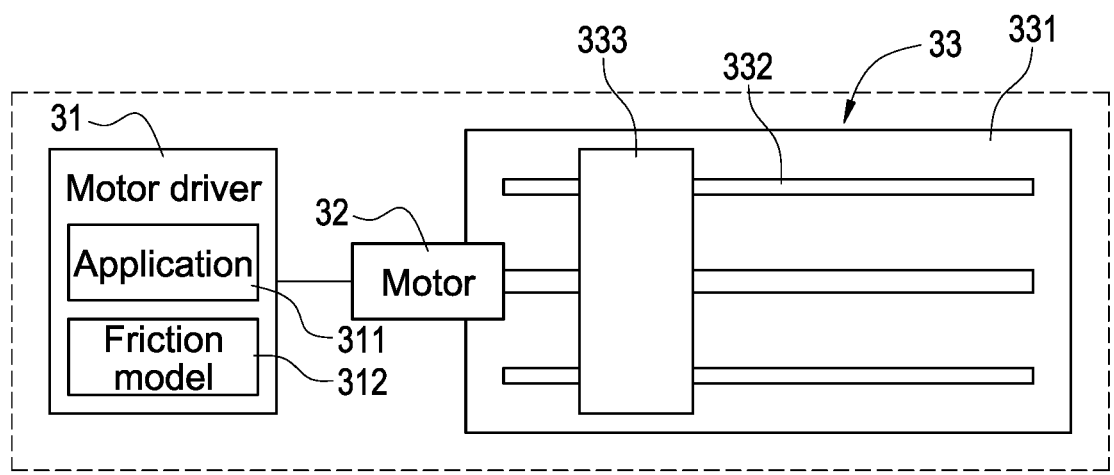
FIG. 2 is a block diagram of a feed system of a first embodiment according to the present invention.

FIG. 2 is a block diagram of a feed system of a first embodiment according to the present invention. As discussed above, the present invention discloses a method for predicting and compensating frictions of feed system (referred to as the compensating method hereinafter), and the compensating method is adopted by a feed system 3 as shown in FIG. 2. In the embodiment of FIG. 2, the feed system 3 mainly includes a motor driver 31, a motor 32 electrically connected with the motor driver 31 and being driven thereby, and at least one set of mechanical components 33 being guided by the rotation of the motor 32 to work and move relatively.

In the embodiment of FIG. 2, the feed system 3 is a type of automation equipment. The at least one set of mechanical components 33 at least includes a bed-body 331, multiple rails 332 arranged on the bed-body 331, and a carrier 333 arranged on at least a part of the rails 332. In this embodiment, the carrier 333 moves back and forth on the bed-body 331 along the rails 332 due to the dragging force caused by the rotation of the motor 32. However, the above description is only one of the pluralities of exemplary embodiments of the present invention, not limited thereto.

In the embodiment, the motor driver 31 is configured to store an application 311, and the motor driver 31 is used to implement the compensating method of the present invention through the execution of the application 311. In particular, the compensating method of the present invention controls the motor driver 31 to monitor and obtain the rotation data of the motor 32, and the motor driver 31 can then calculate, based on the rotation data, the frictions of the feed system 3 as the motor 32 rotates to each of its rotation positions. The frictions mentioned above can be, for example, the maximum static frictions of the feed system 3 caused by the at least one set of mechanical components 33. According to the calculated frictions, the application 311 can be executed to create a friction model 312 with respect to the status of the motor 32.

In the present invention, the friction model 312 is a function of frictions and positions (detailed described in the following). The frictions comprised in such function means the frictions that the motor 32 needs to conquer while the feed system 3 operates, and the positions comprised in such function means the rotation positions of the motor 32 while the motor 32 rotates.

By using the friction model 312, the application 311 can easily predict the frictions that feed system 3 is about to confront while the feed system 3 operates, and the application 311 can then control the motor driver 31 to compensate the rotation of the motor 32 for the predicted frictions. Therefore, the motor 32 after being compensated can conquer actual frictions of the feed system 3 which match the predicted frictions. Through the compensating method of the present invention, the feed system 3 can eliminate the commutation sharp angles of the motor 32 at each commutated portion. By providing enough power to the motor 32 in time for the motor 32 to conquer the frictions that the feed system 3 confronts at different time points, the manufacture quality and accuracy of the feed system 3 can be effectively increased.

In the embodiment, the motor driver 31 is configured to arranged at least one computer readable storage (not shown), the computer readable storage can be, for example, a hard drive disk (HDD), a non-volatile memory, a flash memory, a read only memory (ROM), etc., but not limited to. The computer readable storage is configured to record computer executable program codes, wherein the application 311 discussed above is constituted by the program codes. After the motor driver 31 executes the program codes of the application 311, each necessary step comprised in the compensating method of the present invention can be implemented.

In other embodiment, the computer readable storage can also be individually arranged in an external device, such as a controller, a personal computer, a laptop, a server, etc., which is wired or wirelessly connected to the feed system 3. In this embodiment, the program codes (i.e., the application 311) can be executed by the controller, the personal computer, the laptop, or the server connected to the feed system 3. The executed application 311 can then control the feed system 3, and executes each step of the compensating method of the present invention through the feed system 3, not limited only in the structure disclosed in FIG. 2.

Figure 3:
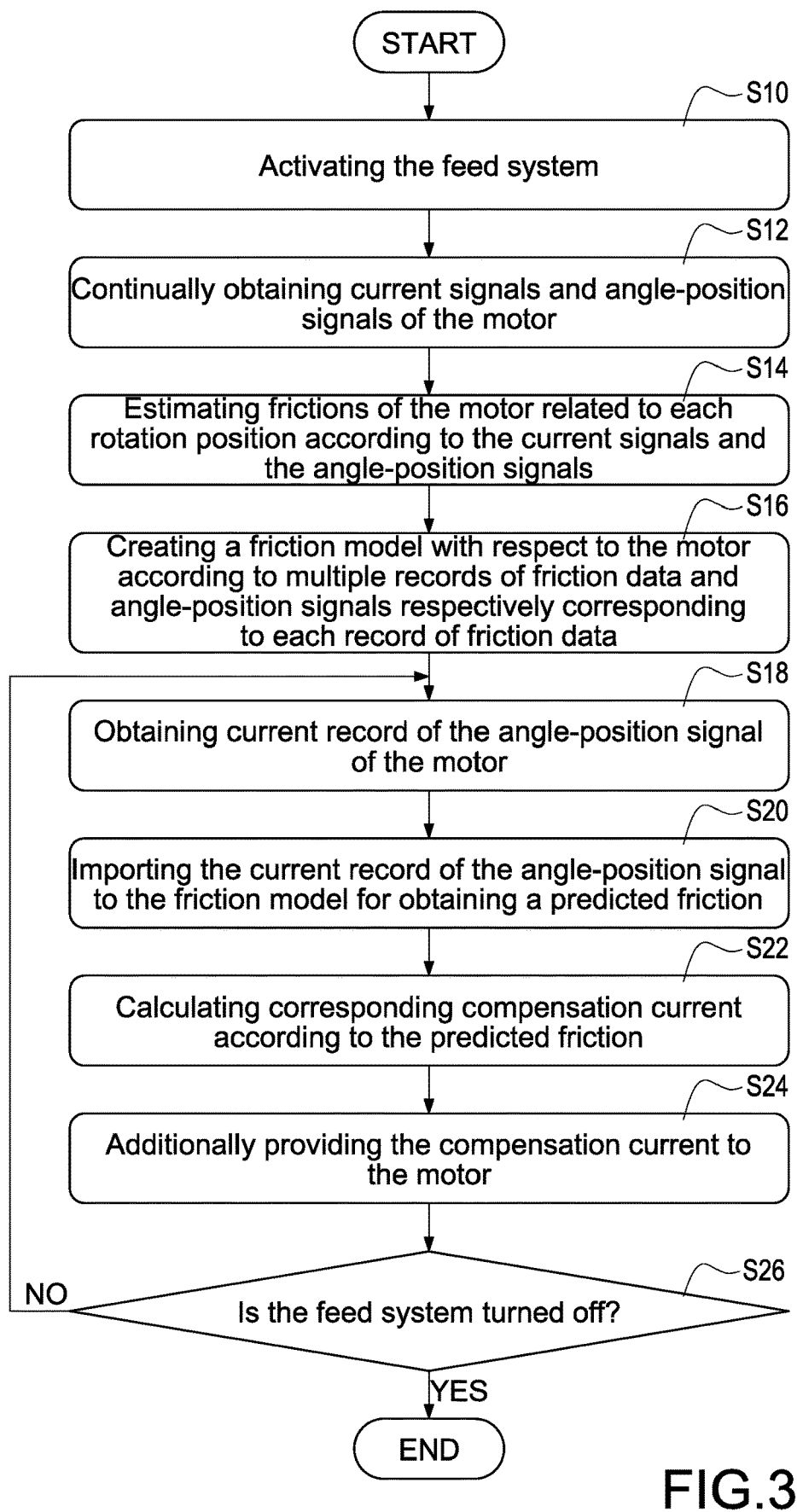
FIG. 3 is a flowchart showing a method for prediction and compensation of a first embodiment according to the present invention.

Please refer to FIG. 3, FIG. 3 is a flowchart showing a method for prediction and compensation of a first embodiment according to the present invention. FIG. 3 discloses each detailed step of the compensating method of the present invention, and these steps are mainly implemented by the feed system 3 as disclosed in FIG. 2, but not limited thereto.

As disclosed in FIG. 3, first, the feed system 3 is activated by a user when needed (step S10). After the feed system 3 is activated, the application 311 is executed by the motor driver 31 or the above-mentioned external device like controller, personal computer, laptop, or server connected to the feed system 3, so as to control the feed system 3 to implement the compensating method of the present invention through the execution of the application 311. For the sake of understanding, the motor driver 31 of the feed system 3 will be taken as a major example for executing the application 311 in the following descriptions in the specification, but not intended to narrow down the claimed scope of the present invention.

After the step S10, the motor driver 31 controls the motor 32 to rotate, and continually obtains current signals and angle-position signals of the motor 32 while the motor 32 rotates (step S12). More specific, the current signals indicate the current amount received by the motor 32 respectively as the motor 32 rotates to each of its rotation positions, and the angle-position signals indicate the rotation position of the motor 32 that the motor 32 currently locates.

In one embodiment, the motor driver 31 continually controls the motor 32 to rotate after the feed system 3 is activated, and continually obtains the current signals and the angle-position signals of the motor 32 therefrom. In other embodiment, the motor driver 31 first controls the motor 32 to perform a ballbar testing after the feed system 3 is activated, and obtains the current signals and the angle-position signals of the motor 32 in an order as the motor 32 rotates to each rotation position during the ballbar testing, until the ballbar testing is completed. The ballbar testing is a common test approach in the technical field of feed systems, detailed description is omitted here.

After the motor driver 31 obtains enough data, for example the amount of the current signals as well as the angle-position signals obtained by the motor driver 31 are beyond a threshold, the motor driver 31 can estimate frictions of the motor 32 related to each rotation position according to the obtained current signals and angle-position signals of the motor 32 upon each rotation position of the motor 32, and then generates multiple records of friction data based on the multiple estimated frictions with respect to different rotation positions (step S14). In particular, the motor driver 31, in the step S14, estimates the frictions that the feed system 3 may confront as the motor 32 rotates to each of the rotation positions, and stores the multiple estimated frictions as the multiple records of friction data.

In one embodiment, the motor driver 31 can calculate the frictions of the motor 32 related to each rotation position according to the following to formulas:

$$C_m = J \times \alpha + \text{sgn}(\omega) \times f_c + \omega \times B + C_g.$$ Formula 1

$$C_f = C_m - J \times \alpha - \omega \times B - C_g.$$ Formula 2

In the formula 1 and the formula 2, $C_m$ indicates the current signal, J indicates a rotating inertia of the motor 32, a indicates an angular acceleration, $\omega$ indicates an angular velocity, sgn( ) indicates forward/reverse information of the motor 32, $f_c$ indicates a coulomb friction, B indicates a viscosity friction coefficient, $C_g$ indicates a constant, $C_f$ indicates the friction of the feed system 3.

In the formula 1, the motor driver 31 first calculates the angular acceleration $\alpha$ and the angular velocity $\omega$ of the motor 32 based on the angle-position signals and corresponding time points of the motor 32 each respectively relates to each of the rotation positions, and then the motor driver 31 calculates the rotating inertia J, the viscosity friction coefficient B, the coulomb friction $f_c$, and the constant $C_g$ through performing a least squares method. The least squares method is a common technique used in the technical field; detailed description is omitted here.

If the current signal $C_m$, the angular acceleration $\alpha$, and the angular velocity $\omega$ of the motor 32 are known (it should be mentioned that in a part of hardware structures, the current signal $C_m$, the angular acceleration $\alpha$, and the angular velocity $\omega$ can be read directly from the motor driver 31), and the above rotating inertia J, the viscosity friction coefficient B, and the constant $C_g$ are calculated, the motor driver 31 can calculate, according to the above formula 2, the frictions $C_f$ that the feed system 3 may confront as the motor 32 rotates to each of the rotation positions.

After the step S14, the motor driver 31 further performs a calculation, based on multiple estimated records of friction data (which are respectively corresponding to different rotation positions) and the multiple angle-position signals (which are respectively corresponding to each of the records of friction data), for creating a friction model 312 with respect to the motor 32 (step S16).

In particular, the motor driver 31 creates the friction model 312 in the step S16 according to the following formula:

$$f(x) = \sum_{i=1}^{k} u(x - c_i) a_i (1 - e^{b_i(x-c_i)}) + d;$$ Formula 3

$$u(x - c_i) = \begin{cases} 1, & x \geq c_i \\ 0, & x < c_i \end{cases}.$$

In the formula 3, u indicates a step function, $a_i$ indicates a first model parameter, $b_i$ indicates a second model parameter, $c_i$ indicates a third model parameter, and d indicates a fourth model parameter.

In one embodiment, the motor driver 31 performs a curve fitting calculation, based on the formula 3, to each of the frictions of the motor 32 corresponding to each rotation position of the motor 32, for obtaining the first model parameter, the second model parameter, the third model parameter, and the fourth model parameter respectively. When the first model parameter, the second model parameter, the third model parameter, and the fourth model parameter are known, the motor driver 31 is able to create the above-mentioned friction model 312 accordingly.

As mentioned above, the friction model 312 is a function of frictions and positions. During the operation of the feed system 3, as long as the rotation position that the motor 32 currently locates (i.e., the angle-position signal corresponding to this rotation position) is imported to the friction model 312, the current friction of the feed system 3 can be obtained directly. As a result, an upcoming friction that the feed system 3 is about to confront, in other words, the friction corresponding to the motor's 32 next rotation position, can be predicted.

In one of the exemplary embodiments, the friction estimated procedure discussed in the step S14 and the friction model creating procedure discussed in the step S16 can be continually executed in the background. In other words, the motor driver 31 can executes the application 311 to continually estimate the frictions of the motor 32 corresponding to each of the rotation positions and to continually create/update the friction model 312, after the feed system 3 is activated, but not limited thereto.

In particular, the status of the motor 32 may vary following the operation time of the feed system 3, such as being worn down, lacking of lubricant, etc., results in affecting its entire friction. Considering such problem, the compensating method of the present invention continually executes the step S14 and the step S16 as mentioned in background for the friction model 312 to be matching the actual status of the motor 32, so the frictions predicted by using the friction model 312 will be more accurate.

After the step S16, the motor driver 31 obtains a current record of the angle-position of the motor 32 (step S18), and imports the current record of the angle-position signal to the friction model 312, for directly obtaining a corresponding predicted friction from the friction model 312 (step S20). In the embodiment, the motor driver 31 is to import the current record of the angle-position signal of the motor 32 to the friction model 312, in order to obtain a friction from the friction model 312 that the feed system 3 may confront as the motor 32 reaches next rotation position (i.e., the predicted friction as mentioned). As a result, the motor driver 31 is allowed to compensate the feed system 3 in advance for conquering the upcoming friction.

After the step S20, the motor driver 31 can execute a specific algorithm or a table checking method (now shown in the FIGs) according to the predicted friction, so as to calculate a corresponding compensation current (step S22). Next, the motor driver 31 additionally provides the compensation current to the motor 32 (step S24), so the motor 32 can have power enough for conquering an upcoming friction same as or approximate to the predicted friction. In particular, the amount of the compensation current is corresponding to the content of the predicted friction. After receiving the compensation current, the motor 32 can increase its rotating force to a level which is enough for conquering the friction of the feed system 3 and can therefore rotate stably.

After the step S24, the motor driver 31 determines whether the feed system 3 is turned off or not (step S26), and continually executes the step S18 to the step S24 as mentioned before the feed system 3 is turned off. Therefore, the motor driver 31 can continually obtain the predicted frictions according to the rotation positions of the motor 32 in real-time, and can continually provide additional compensation current to the motor 32 according to the predicted frictions.

In one embodiment, the motor driver 31 continually provides current to the motor 32 for the motor 32 to rotate while the feed system 3 operates. As mentioned above, at the instant moment that the motor 32 reverses (for example, when the motor 32 needs to guide the mechanical component 33 to move toward the opposite), the motor 32 may lack of power in conquering the friction of the feed system 3, and the speed of the motor 32 may be discontinuous on the commutated portions of the motor 32. For solving such problem, the motor driver 31 can, in the step S24, additionally provide the compensation current to the motor 32 for the motor 32 to have a certain level of power that is enough for conquering the upcoming friction.

However, the above description is only one of the multiple exemplary embodiments of the present invention. The compensating method of the present invention is unnecessary to be only adopted at the commutated portions of the motor 32, instead, it can be adopted in the overall operating period of the feed system 3.

Figure 4:
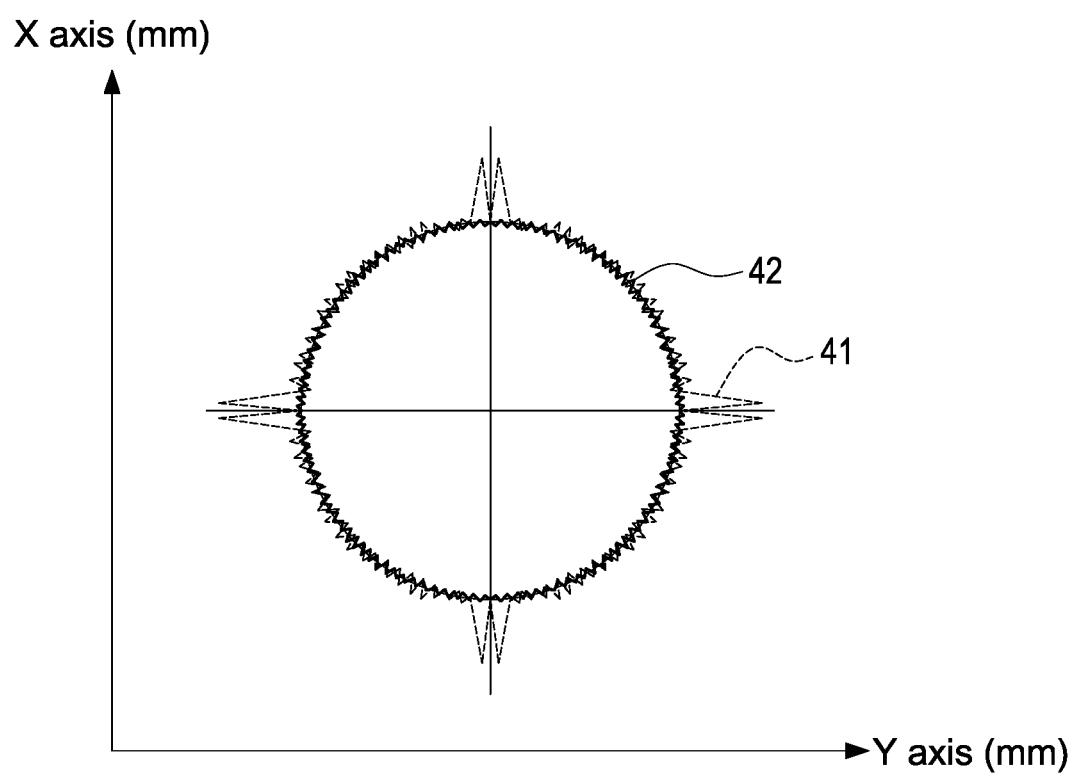
FIG. 4 is a schematic diagram showing a comparison of different frictions of a first embodiment according to the present invention.

FIG. 4 is a schematic diagram showing a comparison of different frictions of a first embodiment according to the present invention. FIG. 4 discloses a ballbar trace before compensation 41 of the motor 32, and a ballbar trace after compensation 42 of the motor 32. In particular, the ballbar trace before compensation 41 records the trace produced by the motor 32 while the motor 32 performs a ballbar testing without applying the compensating method of the present invention, and the ballbar trace after compensation 42 records the trace produced by the motor 32 while the motor 32 performs the ballbar testing after applying the compensating method of the present invention.

FIG. 4 clearly tells that commutation sharp angles may occur at the commutated portions of the motor 32 if the motor doesn't apply the compensating method of the present invention (i.e., no matter how big the friction is, the motor driver 31 does not provide additional compensation current to the motor 32), and it obviously indicates that the motor 32 does not have enough power to conquer the friction and causing the discontinuous speed when the motor 32 rotates reversely. In comparison, the quadrant error of the motor 32 at the commutated portions has been greatly reduced after applying the compensating method of the present invention, it is because the power of the motor 32 as the motor 32 rotates reversely has been compensated in advance by the compensation current provided by the motor driver 31, and it results in that the ballbar trace after compensation 42 of the motor 32 will be smoother in comparing with the ballbar trace before compensation 41 of the motor 32.

As disclosed above, in order to match the friction model 312 with the current status of the motor 32 and makes the predicted friction more precise, the motor driver 31 in the present invention is allowed to execute the application 311 for continually updating the friction model 312 after the friction model 312 has been created. However, it should consume a lot of computation resources of the motor driver 31 if the friction model 312 is updated frequently, so the motor driver 31, in another embodiment, can update the friction model 312 only when the update is necessary.

Figure 5:
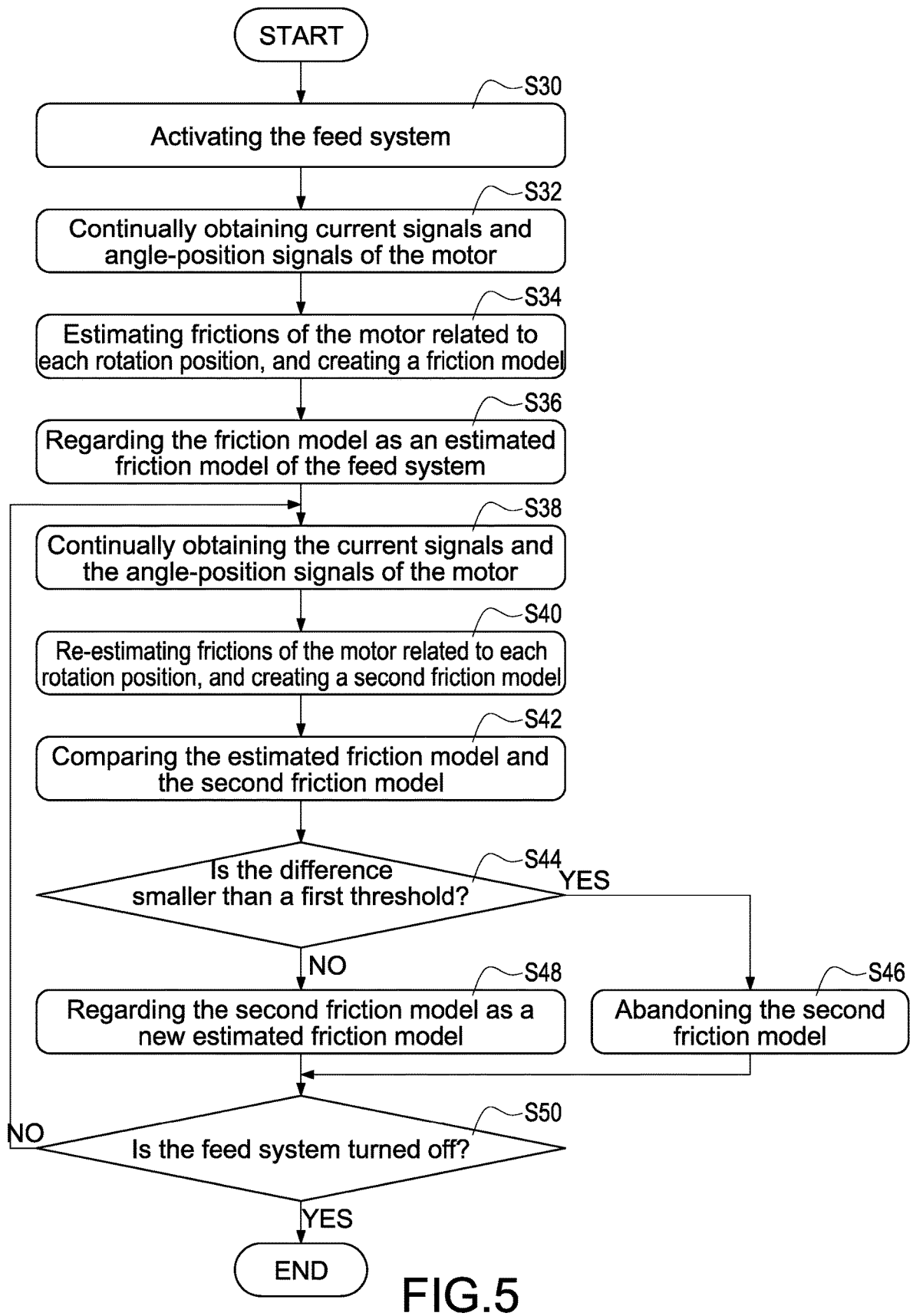
FIG. 5 is an updating flowchart of a friction model of a first embodiment according to the present invention.

Please refer to FIG. 5, which is an updating flowchart of a friction model of a first embodiment according to the present invention. In the embodiment, the feed system 3 is activated by a user when it is needed (step S30). After the feed system 3 is activated, the motor driver 31 controls the motor 32 to rotate, and the motor driver 31 (or an external device connected to the feed system 3) executes the above-mentioned application 311 for continually obtaining the current signals and angle-position signals of the motor 32 (step S32). Based on the obtained current signals and angle-position signals, the motor driver 31 can, through the execution of the application 311, estimate the frictions of the motor 32 related to each rotation position of the motor 32, and then creates a friction model 312 according to the estimated frictions (step S34).

In this embodiment, the friction model 312 created by the motor driver 31 in the step S34 is regarded as a first friction model, and the motor driver 31 considers the first friction model as an estimated friction model of the feed system 3 (step S36). After the estimated friction model has been created, the motor driver 31 imports a current record of the angle-position signal of the motor 32 to the estimated friction model for performing the friction compensation action as discussed above (i.e., to provide additional compensation current to the motor 32 according to predicted frictions).

After the step S36, the motor driver 31 continually obtains the current signals and the angle-position signals of the motor 32 (step S38). Then, the motor driver 31 re-estimates the frictions of the motor 32 related to each of its rotation positions for generating multiple re-estimated records of friction data, and then calculates, based on the multiple re-estimated records of friction data and the multiple angle-position signals respectively corresponding to each of the re-estimated records of friction data, for creating a second friction model (step S40). As creating the second friction model, the motor driver 31 controls the motor 32 to complete the ballbar testing for one time, and obtains the current signals and angle-position signals of the motor 32 related to each of the rotation positions in an order during the ballbar testing. In this embodiment, the motor driver 31 creates the estimated friction model (i.e., the first friction model) and the second friction model according to same approach, however, the time point of creating the second friction model is later than the time point of creating the estimated friction model. As a result, the predicted frictions predicted by using the second friction model, in comparison with the predicted frictions predicted by using the estimated friction model, will be more approximate to the actual status of the motor 32 currently be.

After the step S40, the motor driver 31 compares the estimated friction model and the second friction model (step S42), and determines whether a difference between the estimated friction model and the second friction model is smaller than a first threshold or not (step S44). In this embodiment, the motor driver 31 determines which of the estimated friction model and the second friction model is going to be used in the following operation period of the feed system 3 for predicting the frictions of the feed system 3 according to the difference between the estimated friction model and the second friction model.

As shown in FIG. 5, if the difference between the estimated friction model and the second friction model is smaller than the first threshold, it means the estimated friction model earlier created is still matching the current status of the motor 32. In this scenario, the motor driver 31 directly abandons the second friction model later created (step S46), and remains the estimated friction model for being used to predict the frictions of the feed system 3.

If the difference between the estimated friction model and the second friction model is not smaller than the first threshold, for example, the difference is larger than or equal to the first threshold, it means the estimated friction model earlier created is no longer matching the current status of the motor 32. In this scenario, the motor driver 31 directly applies the second friction model later created to update the estimated friction model earlier created. Else, the motor driver 31 can directly use the second friction model to substitute the estimated friction model. In other words, the motor driver 31 regards the second friction model as a new estimated friction model (step S48).

After the step S46 and the step S48, the motor driver 31 determines whether the feed system 3 is turned off or not (step S50). The motor driver 31 re-executes the step S38 to the step S48 before the feed system 3 is turned off, so the motor driver 31 continually creates the second friction model, continually updates the estimated friction model, and continually predicts the frictions of the feed system 3 through the original/updated estimated friction model, until the feed system 3 is turned off.

According to the technical solution provided by the disclosure of FIG. 5, the motor driver 31 can continually monitor the current signals and the angle-position signals of the motor 32 as the motor 32 rotates, however, the motor driver 31 doesn't have to frequently update the estimated friction model which is used for predicting the upcoming frictions of the feed system 3, so the power and resources of the motor driver 31 can be properly saved.

It should be mentioned that the motor driver 31, in the step S42, is to calculate relative errors between the multiple model parameters of the estimated friction model and the multiple model parameters of the second friction model, so as to determine whether the difference between the estimated friction model and the second friction model is smaller than the first threshold or not.

In one embodiment, the estimated friction model and the second friction model are respectively created according to same formula 3 as discussed above, which is:

$$f(x) = \sum_{i=1}^{k} u(x - c_i) a_i (1 - e^{b_i(x - c_i)}) + d; \, u(x - c_i) = \begin{cases} 1, & x \geq c_i \\ 0, & x < c_i \end{cases}.$$

However, the reference data, such as current signals and angle-position signals, used for creating the models are different, so the estimated friction model and the second friction model may have different model parameters (such as the and d in the formula 3) after being created.

In this embodiment, the motor driver 31 calculates the relative errors between the multiple model parameters of the estimated friction model and the multiple model parameters of the second friction model, for example, the motor driver 31 uses functions like $$\frac{a_{i1} - a_{i2}}{a_{i1}}, \frac{b_{i1} - b_{i2}}{b_{i1}},$$

and so on to calculates the relative errors, and then determines whether the relative errors of these model parameters are respectively smaller than the first threshold. The calculation for such relative errors is a commonly used technique in the technical field, detailed description is omitted here.

In this embodiment, the motor driver 31 abandons the second friction model directly and remains the estimated friction model for being used to perform the friction predicting action for the feed system 3 if the relative errors of these model parameters are respectively smaller than the first threshold. In the other hand, the motor driver 31 uses the second friction model later created to substitute the estimated friction model earlier created and applies the second friction model to perform the friction predicting action for the feed system 3 if one or more of the relative errors of these model parameters is not smaller than the first threshold.

Through the above technical solution, the compensating method of the present invention can predict the upcoming frictions for the feed system 3 by applying the friction model 312, and compensates the frictions by providing additional compensation current to the motor 32 of the feed system 3. Therefore, the manufacture quality and accuracy of the feed system 3 can be effectively improved.

It should be mentioned that another technical solution is also provided by the present invention. In particular, by perennially monitoring the multiple model parameters of the friction model 312, the compensating method of the present invention can further determine the actual health status of the feed system 3 as well as the motor 32 therein.

Figure 6:
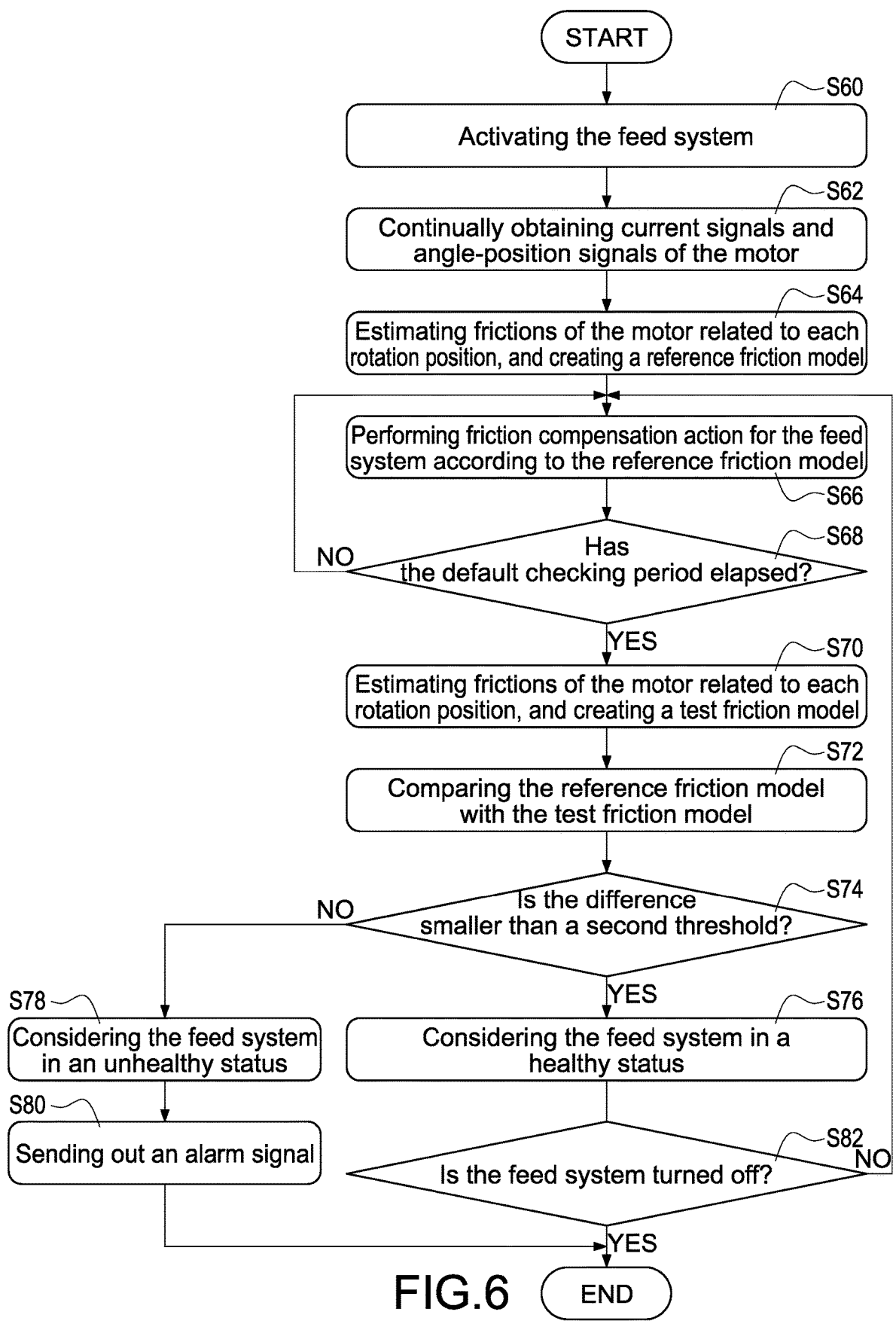
FIG. 6 is a flowchart for estimating health status of a first embodiment according to the present invention.

Please refer to FIG. 6, which is a flowchart for estimating health status of a first embodiment according to the present invention. As shown in FIG. 6, a user first activates the feed system 3 (step S60). After the feed system 3 is activated, the motor driver 31 controls the motor 32 to rotate, and continually obtains the current signals and the angle-position signals as the motor 32 is rotating (step S62). Also, the motor driver 31 estimates the frictions of the motor 32 related to each rotation position according to the obtained current signals and angle-position signals, and then creates the friction model 312 accordingly (step S64).

It is worth saying that the friction model 312 created in the step S64 is regarded as a reference friction model created according to the current signals and the angle-position signals obtained under a best condition of a motor 32. The best condition means, for example, the motor 32 is a new motor, or the motor 32 has just been maintained, etc., but not limited thereto. More specific, the frictions predicted by using the reference friction model will correspond and approximate to the actual frictions of the motor 32 as the motor 32 rotates to each rotation position under its best condition.

After the reference friction model has been created, the motor driver 31 performs the friction compensation action for the feed system 3 according to the reference friction model (step S66). The friction compensation action in this embodiment is to import a current record of the angle-position signal of the motor 32 to the reference friction model for obtaining a predicted friction, and then calculates a corresponding compensation current based on the predicted friction. The friction compensation action here is same as or similar to what is disclosed in the step S18 to the step S24 with respect to FIG. 3, detailed description is omitted.

During the operation of the feed system 3, the motor driver 31 continually records the operation time of the feed system 3, and the motor driver 31 determines whether a default checking period has elapsed (step S68). In the technical solution disclosed in FIG. 6, the motor driver 31 determines whether to estimate the actual health status of the feed system 3 according to the checking period. In particular, the motor driver 31 estimates the health status of the motor 32 of the feed system 3 only if the overall operation time of the feed system 3 is determined beyond the checking period.

In one embodiment, the checking period is a time length of two to four weeks counted from a time point when the feed system 3 is activated, the motor 32 is renewed, or the motor 32 is maintained, but not limited thereto.

If the motor driver 31 determines, in the step S68, that the checking period has not yet elapsed, it means the health status of the feed system 3 is unnecessary to be estimated. In this scenario, the motor driver 31 re-executes the step S66 for continually predicting and compensating the frictions of the feed system 3 according to the reference friction model (or the estimated friction model mentioned in FIG. 5).

If the motor driver 31 determines, in the step S68, that the checking period has elapsed, it means the health status of the feed system 3 is necessary to be estimated. In this scenario, the motor driver 31 estimates multiple frictions of the motor 32 related to each rotation position of the motor 32 based on the obtained current signals and angle-position signals of the motor 32, and then creates another friction model 312 according to the multiple estimated frictions and the multiple angle-position signals respectively corresponding to each of the estimated frictions (step S70).

In the step S70, the motor driver 31 can control the motor 32 to, for example, again execute the ballbar testing, and records the current signals and the angle-position signals of the motor 32 in an order during the ballbar testing. Therefore, the motor driver 31 can estimate the frictions of the motor 32 related to each of its rotation positions under an actual status that the motor 32 currently be.

The friction model 312 created in the step S70 is regarded as a test friction model that is created based on the current signals and angle-position signals of the motor 32 under the actual status of the motor 32. The actual status of the motor 32 here indicates a status that the motor 32 has rotated for a time period equal to the above-mentioned checking period. More specific, the frictions predicted by using the test friction model will be matching the actual frictions of the motor 32 as the motor 32 rotates to each rotation position under its current status.

After the step S70, the motor driver 31 compares the reference friction model with the test friction model (step S72), and determines whether a difference between the reference friction model and the test friction model is smaller than a second threshold or not (step S74). In this embodiment, the motor driver 31 estimates the health status of the feed system 3 and/or the motor 32 according to the difference between the reference friction model and the test friction model.

If the difference between the reference friction model and the test friction model is smaller than the second threshold, it means the feed system 3 and/or the motor 32 only has a small variation in its status. Hence, the motor driver 31 considers the feed system 3 in a healthy status which doesn't need to be maintained or updated (step S76).

Next, the motor driver 31 determines whether the feed system 3 is turned off or not (step S82), and the motor driver 31 re-executes the step S66 to the step S80 before the feed system 3 is turned off, so as to continually create the test friction model, to continually compare the reference friction model with the test friction model, and to continually determine the health status of the feed system 3, until the feed system 3 is turned off.

If the difference between the reference friction model and the test friction model is not smaller than the second threshold, it means the status of the feed system 3 and/or the motor 32 has varied beyond a tolerance range since the feed system 3 and/or the motor 32 is activated, updated, or maintained. In this scenario, the motor driver 31 considers the feed system 3 in an unhealthy status which needs to be maintained or updated (step S78). Moreover, in order to remind the related members to maintain or to update the feed system 3 and/or the motor 32, the motor driver 31 may further send out an alarm signal (step S80). In one embodiment, the motor driver 31 sends the alarm signal through a display or speaker on the feed system 3 (not shown) by way of texts, images, or sounds, or the motor driver 31 sends the alarm signal to an external device wired or wirelessly connected to the feed system 3 for the external device to display the alarm signal.

In the step S72, the motor driver 31 is to calculate relative errors between multiple model parameters of the reference friction model and the multiple model parameters of the test friction model, so as to determine whether the difference between the reference friction model and the test friction model is smaller than the second threshold or not. In an embodiment, the comparing approach used in the step S72 is same as or similar to the comparing approach discussed with respect to the step S42 of FIG. 5, detailed description is omitted here.

It should be mentioned that the motor driver 31 can not only perform the comparison based on the multiple model parameters of the friction model 312 such as the first model parameter $a_i$, the second model parameter $b_i$, the third model parameter $c_i$, and the fourth model parameter d as disclosed in the formula 3, but also compares the similarity of the reference friction model and the test friction model based on the multiple model parameters disclosed in the formula 1 and the formula 2 as mentioned above.

As discussed, the compensating method of the present invention estimates the frictions of the motor 32 related to each rotation position according to the formula 1 and the formula 2, wherein the formula 1 is: $C_m = J \times \alpha + \text{sgn}(\omega) \times f_c + \omega \times B + C_g$, and the formula 2 is: $C_f = C_m - J \times \alpha - \omega \times B - C_g$. In this embodiment, the motor driver 31 also considers the coulomb friction $f_c$, the viscosity friction coefficient B, and the constant $C_g$ in the formulas as the model parameters, and the motor driver 31 also compares the coulomb friction $f_c$, the viscosity friction coefficient B, and the constant $C_g$ in the reference friction model with the coulomb friction $f_c$, the viscosity friction coefficient B, and the constant $C_g$ in the test friction model. Therefore, the compared result will be more accurate.

In this embodiment, the motor driver 31 regards the feed system 3 in a healthy status if the relative errors between the multiple model parameters in the reference friction model between the multiple model parameters in the test friction model are respectively smaller than the second threshold. Moreover, the motor driver 31 regards the feed system 3 in an unhealthy status if one or more of the relative errors of these model parameters is not smaller than the second threshold.

By way of the aforementioned technical solution, the compensating method of the present invention can predict and compensate the frictions for the feed system 3 according to the friction model 312. In the meantime, the compensating method also monitors the variation of the frictions through the friction model 312 for estimating the health status of the feed system 3. Therefore, maintenance and update can be provided to the feed system 3 effectively and properly, which is very convenient.

The compensating method of the present invention is mainly implemented by computer executable program codes, and the program codes are stored in the computer readable storage. In the above embodiments, the computer readable storage is arranged in the feed system 3, and the program codes therein are executed by the motor driver 31 of the feed system 3 for performing each necessary step comprised in the compensating method of the present invention.

In another embodiment, however, the computer readable storage can be arranged in an external device, such as a controller, a personal computer, a laptop, a server, etc., which is connected to the feed system 3 wired or wirelessly. In this embodiment, the program codes of the computer readable storage are executed by the external device so the external device is used to substitute the motor driver 31 in executing each necessary step comprised in the compensating method of the present invention.

More specific, after any of the motor driver 31, the controller, the personal computer, the laptop, and the server, executes the program codes recorded in the computer readable storage, the feed system 3 can be therefore controlled to perform the following steps:

(1) Continually obtaining, from the motor driver 31 of the feed system 3, the current signals and the angle-position signals of the motor 32 of the feed system 3 as the motor 32 is rotating;

(2) Respectively estimating the frictions of the motor 32 related to each rotation position according to the obtained current signals and angle-position signals, for generating multiple records of friction data;

(3) Performing a calculation, based on the multiple estimated records of friction data and the multiple angle-position signals respectively corresponding to each of the records of friction data, for creating a friction model 312 with respect to the motor 32;

(4) Importing a current record of the angle-position signal of the motor 32 to the created friction model 312 for predicting a predicted friction of the feed system 3;

(5) Calculating a compensation current correspondingly according to the predicted friction; and (6) Controlling the motor driver 31 to additionally provide the compensation current to the motor 32 for the motor 32 to have enough power in conquering an actual upcoming friction matching the predicted friction.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for predicting and compensating frictions of a feed system, the feed system including at least one mechanical component, a motor guiding the mechanical component to move, and a motor driver electrically connected with the motor for controlling the motor to rotate, and the method comprising following steps:

a) continually obtaining current signals and angle-position signals of the motor by the motor driver while the motor rotates;

b) estimating frictions of the motor related to each rotation position of the motor according to the current signals and the angle-position signals, for generating multiple records of friction data;

c) performing a calculation, based on the multiple records of friction data and the angle-position signals respectively corresponding to each of the multiple records of friction data, for creating a friction model with respect to the motor while a commutation angle of a ballbar trace occurs at a commutated portion;

d) importing a current record of each angle-position signal of the motor to the friction model for predicting a static friction of the feed system;

e) calculating a compensation current based on the static friction generated by the mechanical component of the feed system; and f) controlling the motor driver to additionally apply the compensation current to the motor so that both a quadrant error of the motor and the commutation angle of the ballbar trace at the commutated portion are reduced.

2. The method as claimed in claim 1, further comprising following steps:

g) determining whether the feed system is turned off or not after the step f); and h) continually executing the step d) to the step f) before the feed system is turned off.

3. The method as claimed in claim 1, wherein the step a) is to control, by the motor driver, the motor to perform a ballbar testing, and to obtain the current signals and the angle-position signals of the motor in an order as the motor rotates to each the rotation position.

4. The method as claimed in claim 1, wherein the step b) is to calculate the frictions of the motor related to each the rotation position of the motor according to a formula 1, the formula 1 is: $C_f = C_m - J \times \alpha - \omega \times B - C_g$, wherein $C_f$ indicates the friction of the feed system, $C_m$ indicates the current signal, J indicates a rotating inertia of the motor, $\alpha$ indicates an angular acceleration of the motor, $\omega$ indicates an angular velocity of the motor, B indicates a viscosity friction coefficient, and $C_g$ indicates a constant.

5. The method as claimed in claim 4, wherein the step b) further executes a formula 2, the formula 2 is: $C_m = J \times \alpha + \mathrm{sgn}(\omega) \times f_c + \omega \times B + C_g$, wherein $\mathrm{sgn}(\ )$ indicates forward/reverse information of the motor, $f_c$ indicates a coulomb friction, and the motor driver in the step b) calculates the angular acceleration and the angular velocity of the motor based on the angle-position signals and corresponding time points of the motor each respectively relates to each the rotation position, and calculates the rotating inertia, the viscosity friction coefficient, the coulomb friction, and the constant through performing a least squares method.

6. The method as claimed in claim 1, wherein the step c) is to create the friction model according to a formula 3, the formula 3 is:

$$f(x) = \sum_{i=1}^{k} u(x-c_i)a_i\left(1-e^{b_i(x-c_i)}\right) + d; \; u(x-c_i) = \begin{cases} 1, & x \geq c_i \\ 0, & x < c_i \end{cases},$$

wherein u indicates a step function $a_i$ indicates a first model parameter, $b_i$ indicates a second model parameter, $c_i$ indicates a third model parameter, and d indicates a fourth model parameter.

7. The method as claimed in claim 6, wherein the step c) is to perform a curve fitting calculation, based on the formula 3, to the frictions of the motor related to each the rotation position of the motor for obtaining the first model parameter, the second model parameter, the third model parameter, and the fourth model parameter respectively.

8. The method as claimed in claim 1, wherein the friction model is an estimated friction model, and the method further comprises following steps:
   g) re-estimating the frictions of the motor related to each the rotation position of the motor, for generating multiple re-estimated records of friction data;
   h) performing a calculation, according to the multiple re-estimated records of friction data and the multiple angle-position signals respectively corresponding to each of the re-estimated records of friction data, for creating a second friction model;
   i) comparing the estimated friction model with the second friction model;
   j) abandoning the second friction model if a difference between the estimated friction model and the second friction model is smaller than a threshold;
   k) updating the estimated friction model based on the second friction model if the difference between the estimated friction model and the second friction model is not smaller than the threshold; and
   l) re-executing the step g) to the step k) according to the estimated friction model before the feed system is turned off.

9. The method as claimed in claim 8, wherein the step m) is to calculate relative errors between multiple model parameters of the estimated friction model and multiple model parameters of the second friction model, and to determine whether each of the relative errors is respectively smaller than the threshold.

10. The method as claimed in claim 1, wherein the friction model is a reference friction model, and the method further comprises following steps:
    g) determining whether an operation time of the feed system is beyond a checking period;
    h) re-executing the step d) to the step f) before the operation time is determined beyond the checking period;
    i) re-estimating the frictions of the motor related to each the rotation position of the motor and generating multiple re-estimated records of friction data when the operation time is determined beyond the checking period;
    j) performing a calculation, according to the multiple re-estimated records of friction data and the multiple angle-position signals respectively corresponding to each of the re-estimated records of friction data, for creating a test friction model;
    k) comparing the reference friction model with the test friction model;
    l) determining that the feed system is in a healthy status if a difference between the reference friction model and the test friction model is smaller than a threshold; and
    m) determining that the feed system is in an unhealthy status and sending an alarm signal if the difference between the reference friction model and the test friction model is not smaller than the threshold.

11. The method as claimed in claim 10, wherein the step k) is to calculate relative errors between multiple model parameters of the reference friction model and multiple model parameters of the test friction model, and to determine whether each of the relative errors is respectively smaller than the threshold.

12. The method as claimed in claim 11, wherein the checking period comprises a time period of two to four weeks.

13. A non-transitory computer readable storage, recorded with computer executable program codes for implementing following steps after the computer executable program codes are executed:
    a) continually obtaining, by a motor driver of a feed system, current signals and angle-position signals of a motor of the feed system while the motor rotates;
    b) estimating frictions of the motor related to each rotation position of the motor according to the current signals and the angle-position signals, for generating multiple records of friction data;
    c) performing a calculation, based on the multiple records of friction data and the angle-position signals respectively corresponding to each of the multiple records of friction data, for creating a friction model with respect to the motor while a commutation angle of a ballbar trace occurs at a commutated portion;
    d) importing a current record of the angle-position signal of the motor to the friction model for predicting a static friction of the feed system;
    e) calculating a compensation current based on the static friction generated by the mechanical component of the feed system; and
    f) controlling the motor driver to additionally apply the compensation current to the motor so that both a quadrant error of the motor and the commutation angle of the ballbar trace at the commutated portion are reduced.

14. The non-transitory computer readable storage as claimed in claim 13, wherein the computer executable program codes are executed by the motor driver of the feed system, or executed by a controller, a personal computer, a laptop, or a server wired or wirelessly connected to the feed system.

* * * * *